US009026453B2

(12) United States Patent
Grossman et al.

(10) Patent No.: US 9,026,453 B2
(45) Date of Patent: May 5, 2015

(54) READABLE INDICIA FOR HEALTHCARE PAYMENT CODES

(75) Inventors: Glenn Grossman, Matthews, NC (US); Laura Corinne Bondesen, Charlotte, NC (US); Matthew A. Calman, Charlotte, NC (US); David M. Grigg, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 299 days.

(21) Appl. No.: 13/589,639

(22) Filed: Aug. 20, 2012

(65) Prior Publication Data

US 2014/0052459 A1    Feb. 20, 2014

(51) Int. Cl.
    *G06Q 50/22* (2012.01)
(52) U.S. Cl.
    CPC .................................... *G06Q 50/22* (2013.01)
(58) Field of Classification Search
    USPC ........................................................ 705/2–34
    See application file for complete search history.

(56) References Cited

U.S. PATENT DOCUMENTS

| 2011/0251892 | A1 | 10/2011 | Laracey |
| 2012/0016731 | A1 | 1/2012 | Smith et al. |
| 2012/0078782 | A1 | 3/2012 | Schoenberg et al. |
| 2012/0084162 | A1 | 4/2012 | Smith et al. |
| 2012/0085829 | A1 | 4/2012 | Ziegler |
| 2012/0239417 | A1* | 9/2012 | Pourfallah et al. ............... 705/2 |
| 2012/0253852 | A1* | 10/2012 | Pourfallah et al. ............... 705/4 |

OTHER PUBLICATIONS

Van Grove, Jennifer, "SCVNGR Unveils QR Code Payment System", Oct. 12, 2011, pp. 1-3.*
Suruchi Joshi, "iMingle launches QR code bill payment site", Electronic Payments International, Aug. 11, 2011, http://www.vrl-financial-news.com/cards--payments/electronic-payments-intl/issues/epi-2011/epi-290/imingle-launches-qr-code-bill.aspx.
"QR Applications—Quick Payment Processing", Output Links, http://outputlinks.com/html/columnists/Joe_Barber/copi_QR_Applications_Payment_Processing_022309.aspx.

* cited by examiner

*Primary Examiner* — Robert Morgan
*Assistant Examiner* — Michael Tomaszewski
(74) *Attorney, Agent, or Firm* — Michael A. Springs; Moore & Van Allen PLLC; Nicholas C. Russell

(57) ABSTRACT

Embodiments of the invention include systems, methods, and computer-program products for providing readable indicia for healthcare codes. As such, a readable indicia may be presented at a point-of-transaction (POT) for a user to select. The system may dynamically present the readable indicia based on the user, the merchant, and the products of the transaction. The user may select the readable indicia with his/her user device. Upon selection, the system may provide the user with private viewing and selecting of alternative payment methods available to the user for that transaction. Alternative payment methods may include insurance or government programs. The system may receive authorization to apply one of the alternative payment methods to the transaction. As such, the invention provides private, yet expedited transaction capabilities using alternative payment methods at a merchant POT.

23 Claims, 11 Drawing Sheets

Statement

MEDICAL TREATMENT PROVIDER

MEDICAL TREATMENTS 1102

| DATE 1104 | TREATMENT 1106 | PRICE 1108 |
|---|---|---|
| DATE A | TREATMENT A | $ XX.XX |
| DATE A | TREATMENT B | $ XX.XX |
| DATE A | TREATMENT C | $ X.XX |
| DATE B | TREATMENT D | $ XXX.XX |
| DATE B | TREATMENT E | $ XX.XX |

READABLE INDICIA AVAILABLE FOR ITEMIZED TREATMENT AND PAYMENT METHOD 1110

SCAN READABLE INDICIA 1112

TOTAL DUE $ XXX.XX

COMPLETE TRANSACTION 1114

Figure 11

READABLE INDICIA FOR HEALTHCARE PAYMENT CODES

BACKGROUND

Over the years, primary methods for payment have evolved from cash to checks to credit and debit cards. In addition, many alternate forms of payment are available including government programs such as flexible spending accounts (FSA), health savings accounts (HSA), Women, Infants and Children (WIC) program, Supplemental Nutrition Assistance Program (SNAP), and the like. As technology continues to progress, needs arise to provide improved methods of conducting financial transactions.

When a customer uses a primary method of payment for a transaction, the transaction is typically completed quickly and effectively. However, a customer using alternate forms of payment typically notice slow transaction completion and some uncertainty with respect to out of pocket cost as the point-of-transaction. Furthermore, there may be negative connotations associated with some alternative payment methods.

Therefore, a need exists for an expedited, private way to provide and accept using alternative payment methods for purchasing products at a point-of-sale. As well as provide private information associated with the alternative payment method to the customer.

BRIEF SUMMARY

Embodiments of the present invention address the above needs and/or achieve other advantages by providing apparatuses (e.g., a system, computer program product and/or other devices) and methods for an expedited, yet private, means for providing and accepting information associated with alternative payment methods, medical office payments, or insurance payments via readable indicia.

Some embodiments of the invention provide for readable indicia for healthcare payment codes. As such, a user may be presented with the able to select, via his/her user device, available alternative payment methods for the purchase of products at a merchant point-of-transaction (POT). In this way, a user may wish to transaction for one or more products from a merchant. Upon initiation of a transaction at a POT, a readable indicia may be presented at the POT for the user to select, scan, read, or the like via his/her user device. The readable indicia may be presented at the POT at a POT device, such as a register, electronic card reader, merchant scanner, or the like. The readable indicia may include, but is not limited to a bar code, quick response (QR) code, token, contact connection, near field connection, contactless connection, and/or the like. In this way, the readable indicia may be scanned by the user at the POT and provide the user with the ability to quickly view, select, and process payment for products of the current transaction that are eligible for alternative payment methods. Alternative payment methods may include, but are not limited to government programs (such as flexible spending accounts (FSA), health savings accounts (HSA), Women, Infants and Children (WIC) program, Supplemental Nutrition Assistance Program (SNAP), and the like), insurance (medical, prescription, auto, and the like), and the like.

The products of the user's transaction that are eligible for alternative payment methods may be visualized by the user via a screen associated with his/her user device. This visualization allows a user to privately view the products that are eligible for alternative payment methods that are available to the user. For example, the transaction may include several food items that may be eligible for food stamps. As such, the food items that are eligible for that user's food stamps may be visualized by the user. At this point, the user may select the products and alternative payment method accounts that he/she wishes to use for that transaction. The system may then provide the alternative payment method account information to the merchant for the transaction. As such, there may be complete privacy for the user using the alternative payment method for the transaction.

Some embodiments of the invention provide for readable indicia for medical office payment. As such, a user may be presented with, via his/her user device, insurance information associated with medical treatment. Medical treatments may include, but is not limited to treatment at medical offices, dentist offices, hospitals, clinics, chiropractors, or the like. Upon completing the transaction with the medical treatment provider, a POT, screen, or the like associated with the medical provider may present readable indicia for the user. The presented readable indicia may be user specific, such that upon scanning the readable indicia, the user may receive insurance information associated with the medical treatment. As such, the system may communicate with insurance providers and the medical treatment provider to determine and present the user with itemized list of treatments performed, the treatments covered by insurance, a co-pay amount, an amount to be paid by the insurance company, detectable information, and an amount the user will owe the medical treatment provider for the medical treatment performed. At this point the user may be able to pay his/her amount owed via his/her mobile wallet using the user device. The user may also pay the remaining balance owed by traditional means, such as cash, check, or credit card.

Some embodiments of the invention provide for readable indicia for insurance payments. In this way, when the user receives a statement from a medical treatment provider or the like where insurance may have covered a portion of the cost associated with the transaction, a readable indicia may be placed on the statement. The statement may be electronic or physical form. As such, a user may be able to scan the readable indicia using his/her user device. As such, the system may provide the user with itemized treatments received and payment methods for each. Furthermore, the user may receive information associated with his/her insurance policy, such as deductible and/or the like. The itemized treatments received may indicate the treatments that the user received from the medical provider during the visit, such as exams, tests, and the like. Payment methods for each include an amount, if any, that an insurance company may have contributed and/or the amount due from the user for the treatment.

In each of the embodiments, there may be one or more various indicia that may be provided to a user. In this way, the indicia may be provided dynamically to the user. In some embodiments, the indicia may provide information associated with alternative payment methods. In some embodiments, the indicia may provide information associated with a medical office payment. In yet other embodiments, the indicia may provide information associated with insurance payment. Such as statements, bills, or the like that include some insurance payment associated with the product or treatment received.

In some embodiments the information may be determined prior to the user scanning the readable indicia. In this way, the scanning of the readable indicia may allow for a communication link with a server, database, or the like. The server may comprise the information associated with alternative payment methods, medical office payment, or insurance payment.

In some embodiments the information may be determined after the user scans the readable indicia. Once the indicia is presented at a POT the user may scan the readable indicia via his/her user device, such as a mobile phone, Personal Digital Assistant (PDA), or the like. Upon scanning the readable indicia the system may determine and provide the user with information associated with alternative payment methods, medical office payment, or insurance payment.

The information associated with alternative payment methods, medical office payment, or insurance payment may be presented to the user via his/her user device. The user may then review, select, and/or accept the information for the transaction. The user may review, select, and/or accept the information by selecting it on his/her user device. The selected offers may then be communicated to the POT and be applied to the transaction.

Embodiments of the invention relate to systems, methods, and computer program products for processing readable indicia for healthcare payment codes, comprising: receiving an indication that a user is initiating a transaction at a point-of-transaction (POT) of a merchant; receiving information associated with one or more products of the transaction; determining alternative payment methods available for the products of the transaction, wherein the available alternative payment methods are based at least in part on one or more of information associated with the products of the transaction, information associated with the user initiating the transaction, or the merchant of the transaction; presenting to the user a readable indicia, wherein the readable indicia includes information associated with the alternative payment methods available for the products; receiving an indication that user selected the readable indicia; presenting the products of the transaction and alternative payment methods available for the products to the user via a mobile device; receiving communication of user accepted alternative payment methods for one or more products of the transaction; and allowing processing of the transaction using the accepted alternative payment methods, such that the alternative payment methods are applied to the transaction.

In some embodiments, determining alternative payment methods available for the products of the transaction: determining the user eligibility for each of one or more alternative payment methods, wherein the user eligibility is based on one or more of user enrollment in the one or more alternative payment method and current status of a user's alternative payment method account; determining product eligibility for the one or more alternative payment methods; the eligible alternative payment methods available to the user; determining merchant acceptance of the one or more alternative payment methods; and determining if more than one of the one or more alternative payment methods apply to a single product of the transaction.

In some embodiments, the alternative payment methods include insurance coverage or government programs associated with transaction aid for the user.

In some embodiments, presenting to the user a readable indicia further comprises dynamically presenting the readable indicia at the POT of the merchant, such that the readable indicia changes form based at least in part on the available alternative payment methods available. In some embodiments, the readable indicia comprises a Quick Response (QR) code. In yet other embodiments, the readable indicia is comprised in a tag that transmits information wirelessly.

In some embodiments, receiving an indication that user selected the readable indicia further comprises receiving an indication from the mobile device that comprises an image-capturing component, and wherein an image of the readable indicia is captured by the mobile device.

In some embodiments, the merchant is a merchant that accepts one or more alternative payment methods as payment for the transaction.

In some embodiments, the government programs associated with transaction aid for the user are based at least in part on one or more alternative payment method accounts, wherein the alternative payment method accounts include one or more government available accounts, such as flexible spending accounts (FSA), health savings accounts (HSA), Women, Infants and Children (WIC) program, or Supplemental Nutrition Assistance Program (SNAP).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
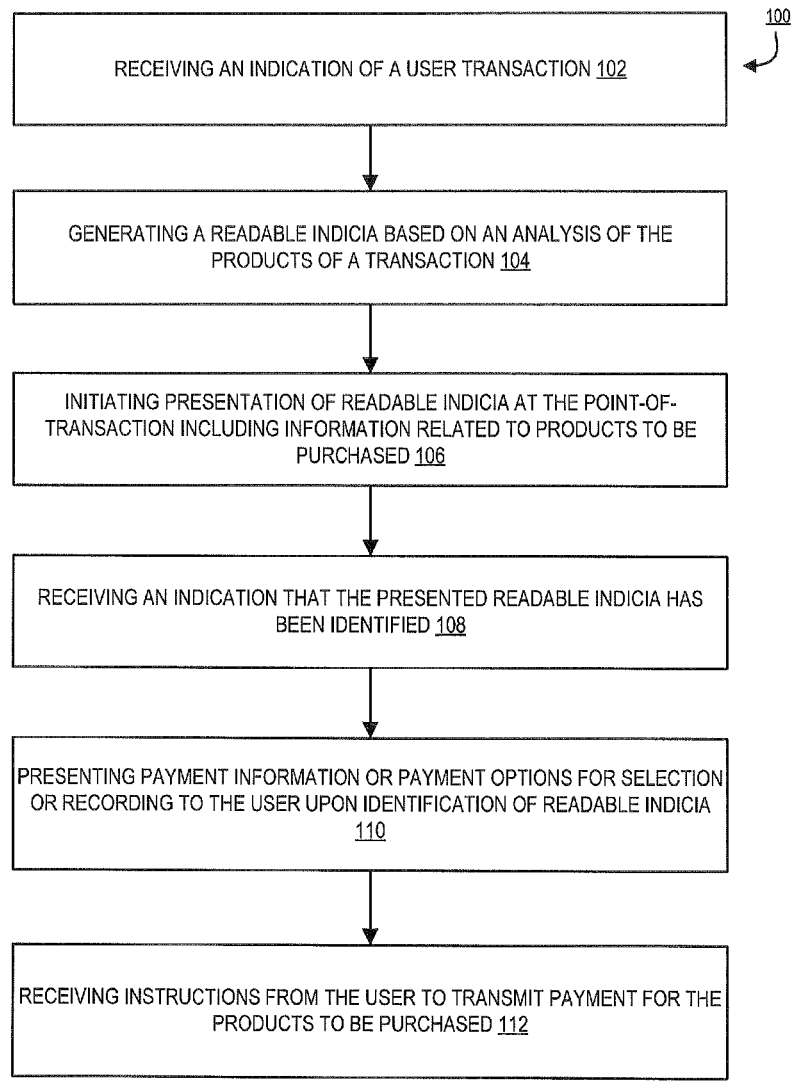
Figure 2:
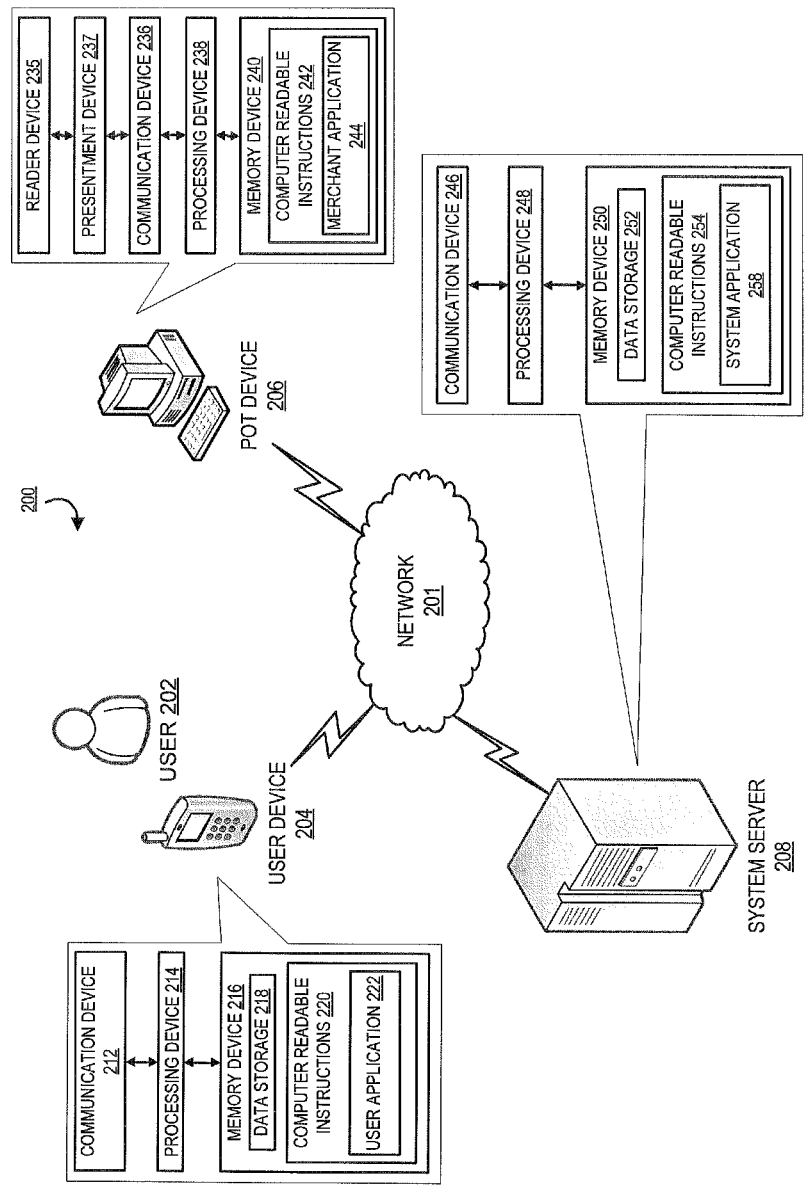
Figure 3:
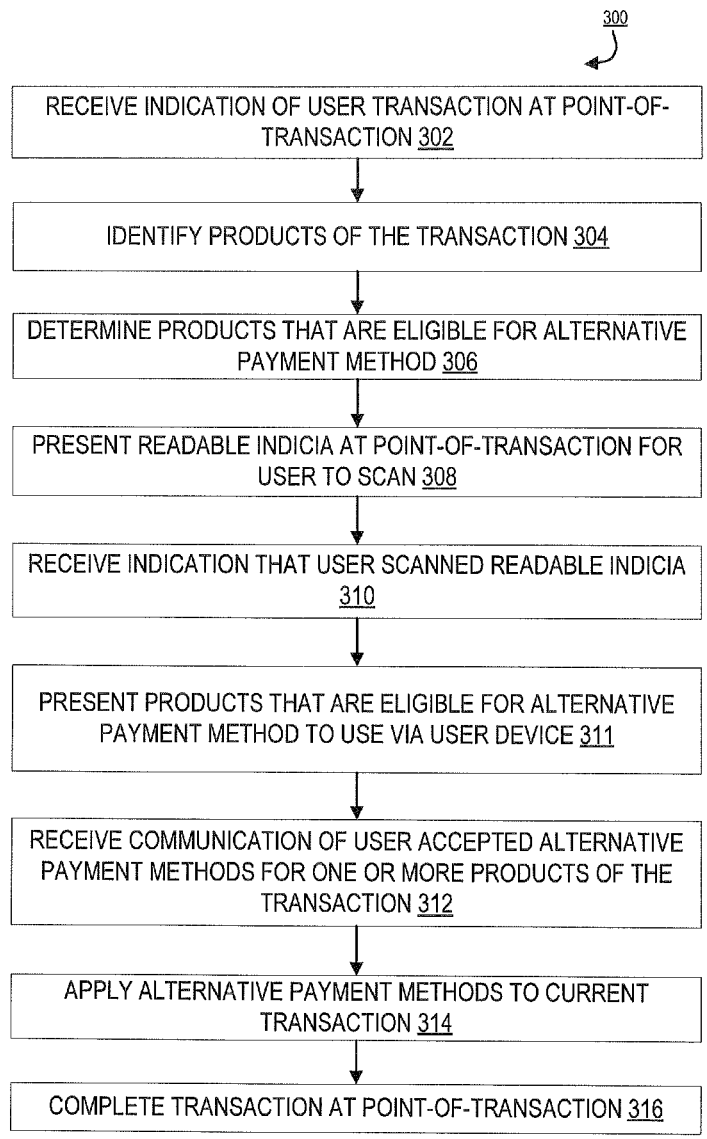
Figure 4:
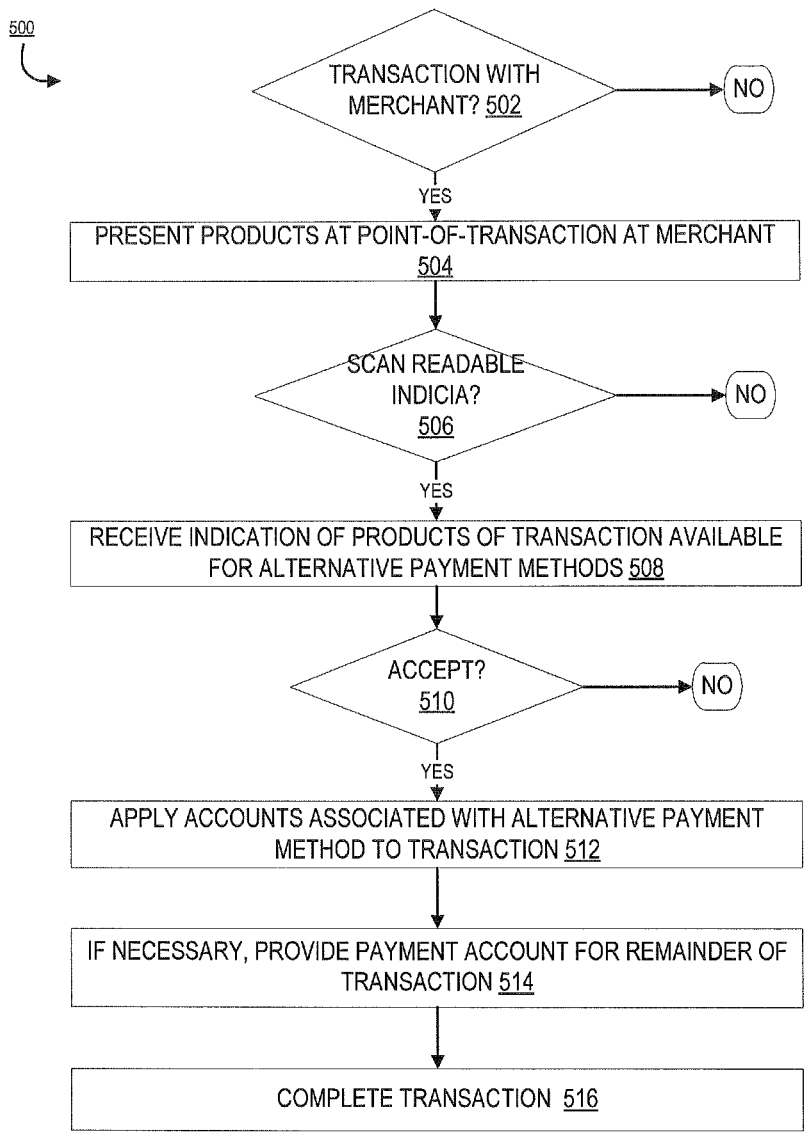
Figure 5:
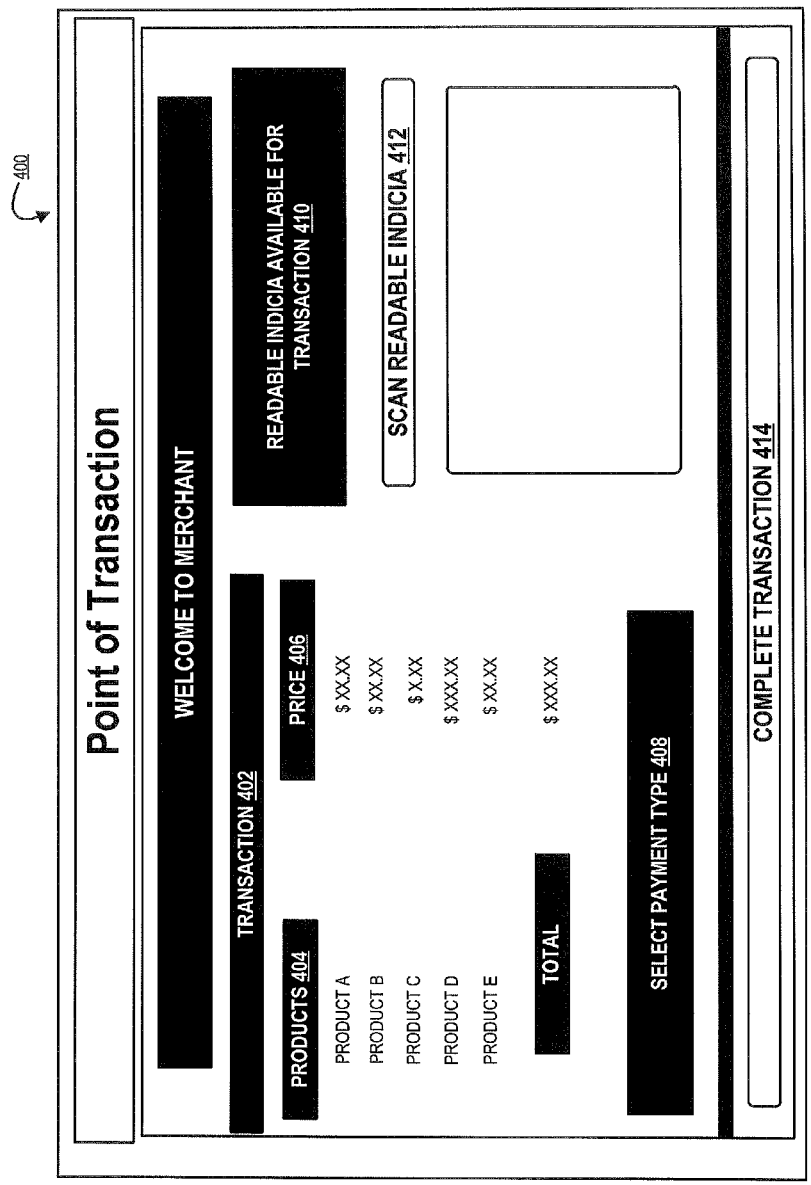
Figure 6:
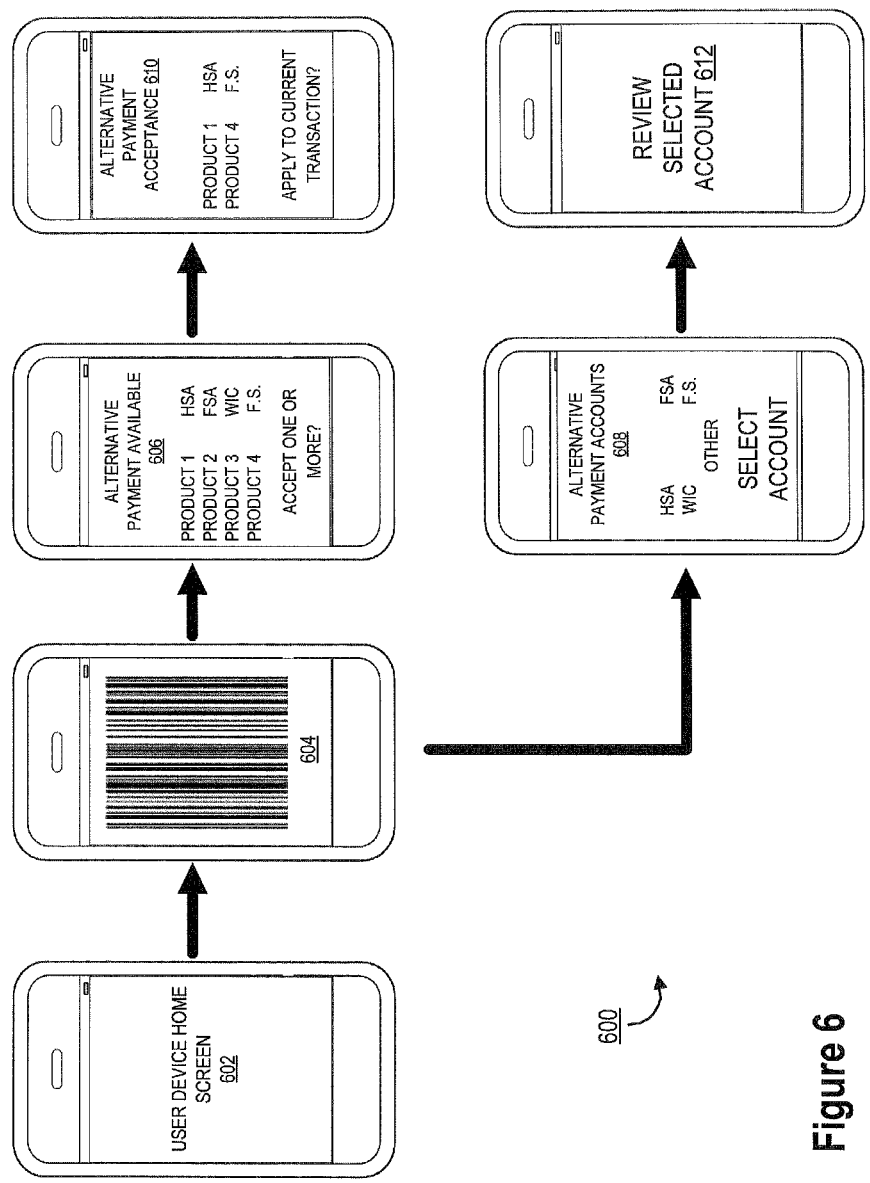
Figure 7:
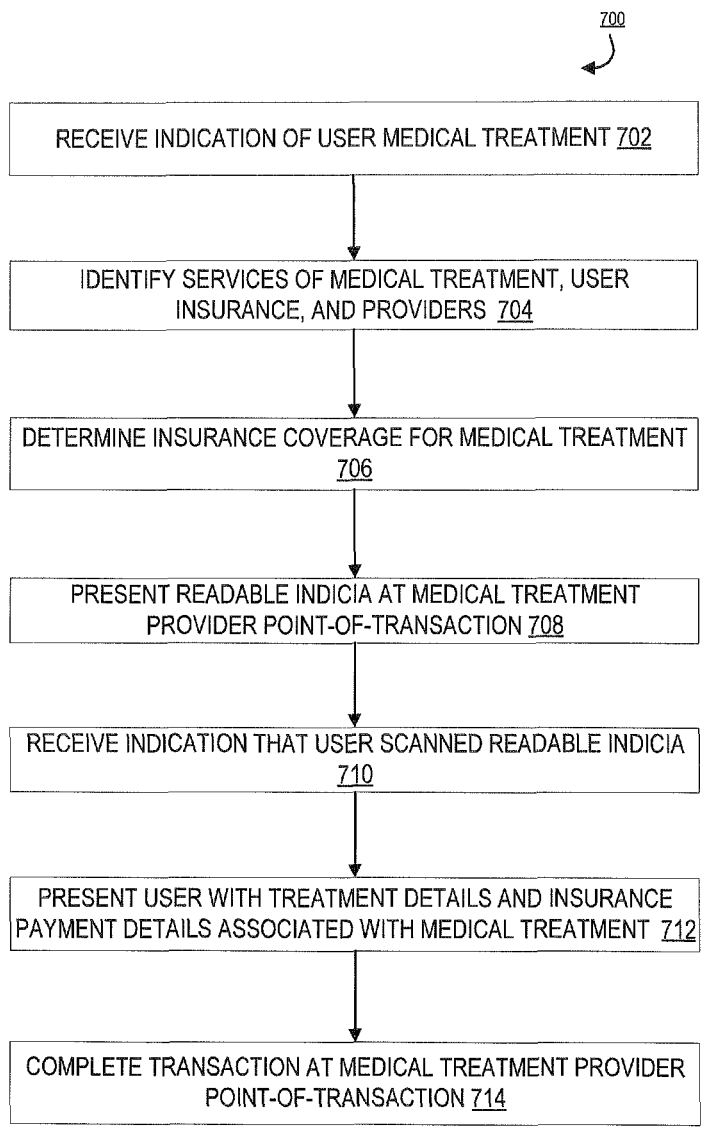
Figure 8:
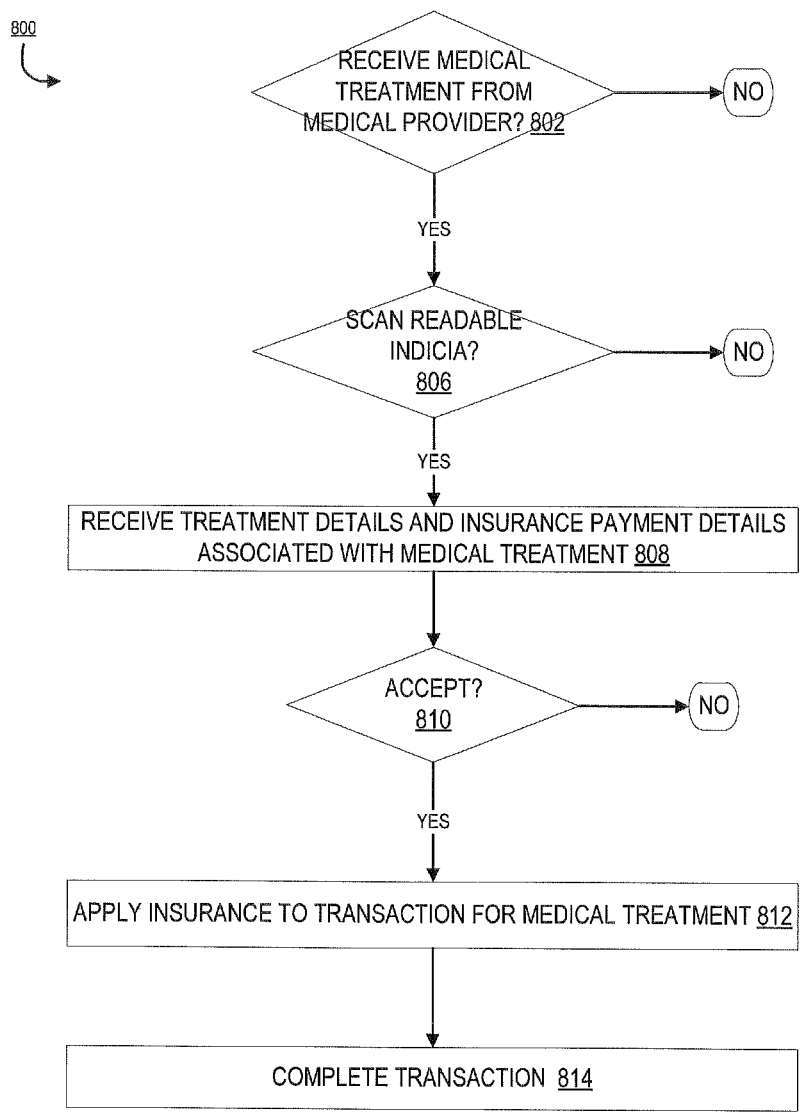
Figure 9:
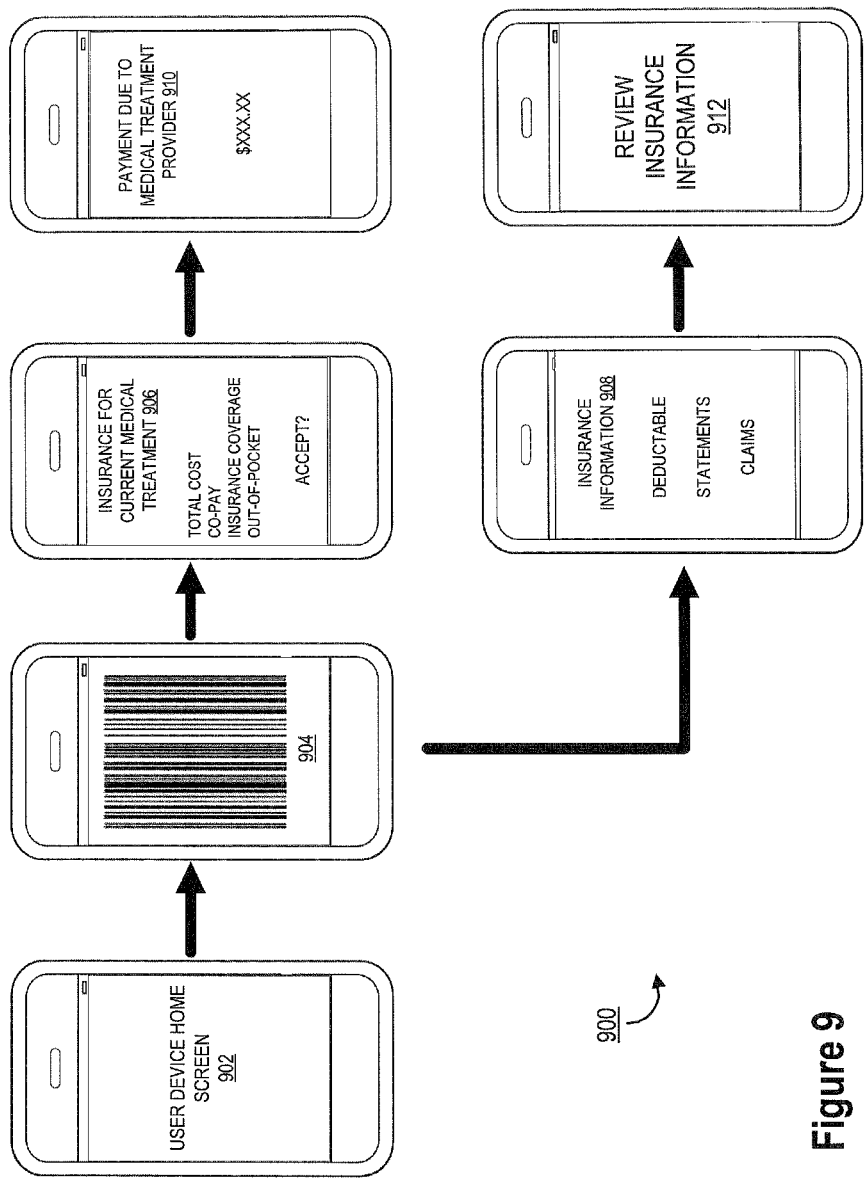
Figure 10:
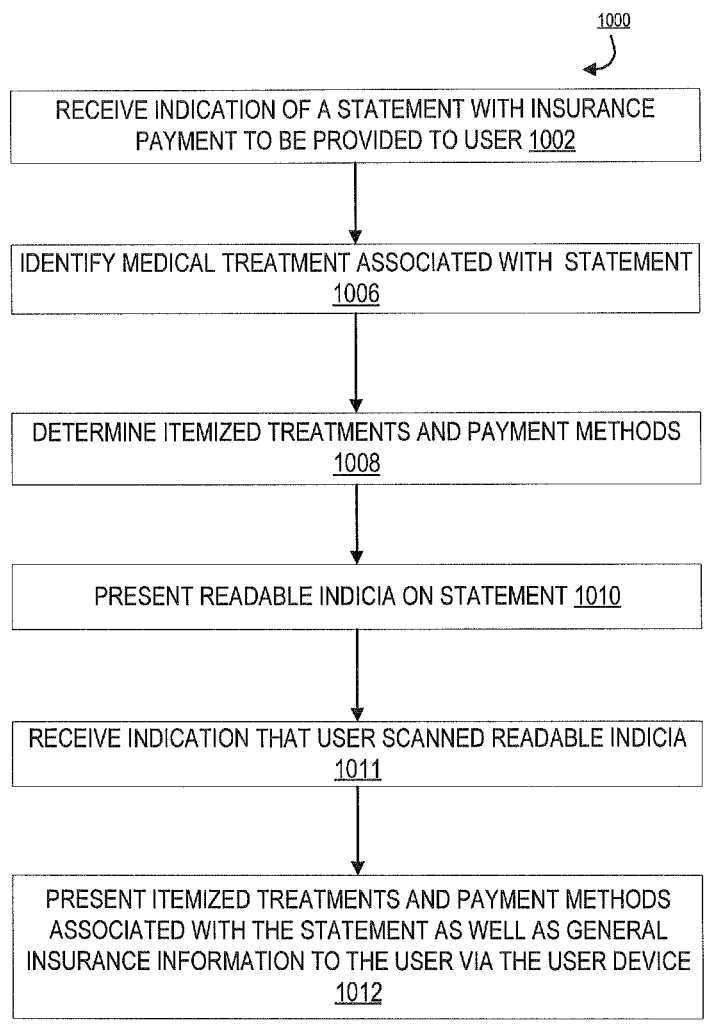

Having thus described embodiments of the invention in general terms, reference will now be made to the accompanying drawings, wherein:

FIG. 1 provides a high level process flow illustrating using a readable indicia at a point-of-transaction (POT), in accordance with one embodiment of the present invention;

FIG. 2 provides a readable indicia processing system environment, in accordance with one embodiment of the present invention;

FIG. 3 provides a process map illustrating presentment and acceptance of alternative payment methods using readable indicia at a POT, in accordance with one embodiment of the present invention;

FIG. 4 provides a decision map illustrating user selection of presentment and acceptance of alternative payment methods using readable indicia at a POT, in accordance with one embodiment of the present invention;

FIG. 5 provides an illustration of a POT interface incorporating a readable indicia, in accordance with one embodiment of the present invention;

FIG. 6 provides an illustration of a user device interface for user viewing, selection, and acceptance of alternative payment methods, in accordance with one embodiment of the present invention;

FIG. 7 provides a process map illustrating presentment of medical office payments using readable indicia at a medical treatment provider POT, in accordance with one embodiment of the present invention;

FIG. 8 provides a decision map illustrating user selection and viewing of medical office payments using readable indicia, in accordance with one embodiment of the present invention;

FIG. 9 provides an illustration of a user device interface for user viewing of medical office payments using readable indicia, in accordance with one embodiment of the present invention;

FIG. 10 provides a process map illustrating presentment insurance payments using readable indicia from a statement, in accordance with one embodiment of the present invention; and FIG. 11 provides an illustration of a statement incorporating a readable indicia, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. The term "readable indicia" as used herein may include, but is not limited to a bar code, quick response (QR) code, token, contact connection, near field connection, contactless connection, and/or the like. A "merchant" as used herein may refer to a manufacturer, retailer, service provider, event provider, warehouse, supplier, medical service provider, medical treatment provider and/or the like. A "medical treatment provider" may be any hospital, clinic, office, pharmacy, or the like associated with providing medical services or treatments of any kind Furthermore, as used herein, the term "product" shall mean any good, service, event, medical service, and/or the like that may be offered by a merchant.

Further, the embodiments described herein may refer to use of a transaction or transaction event to trigger the point-of-transaction (POT) offer processing program. Unless specifically limited by the context, a "transaction" refers to any communication between the user and a merchant, financial institution, insurance company, hospital, or other entity. A "transaction" may also include a bill, statement, purchase at a POT, online purchase, purchase at a merchant, and/or the like. For example, in some embodiments, a transaction may include one or more of the following: purchasing, renting, leasing, bartering, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like. For example, a transaction may occur when a user purchases a product at a merchant. In yet other embodiments, for example, a transaction may occur when an entity associated with the user is alerted. In still another embodiment, for example, a transaction may occur when a user receives a statement (or a bill) for medical treatment or the like that an insurance company has previously been billed. A transaction may occur when a user accesses a building, uses a rewards card, and/or performs an account balance query. A transaction may occur as a user's device establishes a wireless connection, such as a Wi-Fi connection, with a point-of-transaction terminal.

In still further embodiments, a transaction may refer to an event and/or action or group of actions facilitated or performed by a user's device, such as a user's mobile system, a merchant system, and/or a combination thereof. A device capable of facilitating or performing a transaction may be referred to herein as a "POT system" or "POT device." A "point-of-transaction" or "POT" could refer to any location, virtual location or otherwise proximate occurrence of a transaction. A POT system may refer to any device used to perform a transaction, either from the user's perspective, the merchant's perspective or both. In some embodiments, the POT system refers only to a user's system, in other embodiments it refers only to a merchant system, and in yet other embodiments, it refers to both a user device and a merchant device interacting to perform a transaction. For example, in one embodiment, the POT system refers to the user's mobile device configured to communicate with a merchant's system, whereas in other embodiments, the POT system refers to a merchant's system configured to communicate with a user's mobile device, and in yet other embodiments, the POT system refers to both the user's mobile device and the merchant's system configured to communicate with each other to carry out a transaction.

In some embodiments, a POT system is or includes an interactive computer terminal that is configured to initiate, perform, complete, and/or facilitate one or more transactions. A POT system could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smart-phone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a POT system is operated in a public place (e.g., on a street corner, at the doorstep of a private residence, in an open market, at a public rest stop, or the like). In other embodiments, the POT system, is additionally or alternatively operated in a place of business (e.g., in a retail store, post office, banking center, grocery store, factory floor, or the like). In accordance with some embodiments, the POT system is not owned by the user of the POT system. Rather, in some embodiments, the POT system is owned by a mobile business operator or a POT operator (e.g., merchant, vendor, salesperson, or the like). In yet other embodiments, the POT system is owned by the financial institution offering the POT system providing functionality in accordance with embodiments of the invention described herein.

FIG. 1 provides a high level process flow illustrating using a readable indicia at a point-of-transaction (POT) 100, which will be discussed in further detail throughout this specification with respect to FIGS. 2 through 11. The first step in the process 100, as illustrated in block 102 is receiving an indication that a user has initiated a transaction. In some embodiments, the transaction may be at a POT. In other embodiments, the transaction may be a statement associated with a transaction using insurance. For example, a user may receive a statement for a medical bill. The medical bill may have a portion of the amount owed already paid by the user's medical insurance. The received statement with the amount owed by the user may be considered a transaction.

The indication of a user transaction may be any kind of notice that the user has initiated the purchase of a product at any type of POT, whether via a check-out kiosk, at a merchant POT, online shopping cart, other electronic check-out systems, being sent a statement, receiving a statement, receiving medical treatment, and/or the like.

Next, the system may generate a readable indicia based on an analysis of the product of the user's transaction, as illustrated in block 104. The analysis of the products of the user's transaction include determining information associated with alternative payment methods, medical office payments, or insurance payments.

Once the system recognizes that a user is initiating a transaction, the system may initiate the presentation of readable indicia at the POT, as illustrated in block 106. The readable indicia may be readable by a user via his/her user device. As such, the indicia may include, but is not limited to bar code, quick response (QR) code, scanning communication, picture recognition, number recognition, contact connection, near field connection, and/or the like.

In some embodiments, the system may generate a readable indicia based on an analysis of the product of the user's transaction, then the system may present the readable transaction. In other embodiments, the readable indicia may be presented first. Once selected or scanned by the user, the system may provide an analysis of the product of the user's transaction. As such, in some embodiments, the indicia may provide for a communication link between the user device and the system. In this way, the readable indicia may provide information associated with alternative payment methods, medical office payment, or insurance payment based on post scan-data, such as data stored in a database, financial institution data, user device, manually inputted data, or the like.

Next, as illustrated in block 108, the system recognized an indication that the presented readable indicia has been identified by the user. This detection may be done using a camera, scanner, or other recognition medium on a user device. In some embodiments, the user may decide not to detect the indicia at the POT, as such the user may proceed to complete his/her transaction without utilizing the information available to him/her using readable indicia.

As illustrated in block 110, after the user has recognized the indicia and detected it with his/her user device, the user may be presented with payment information or payment options for selection or recording of information associated with alternative payment methods, medical office payment, or insurance payment. As such, the user may receive information at his/her user device for alternative payment methods, medical office payment, or insurance payments.

Finally, in some embodiments, as illustrated in block 112, the system may receive instructions from the user to transmit payment and or other information for the transaction with respect to alternative payment methods, medical office payments, or insurance payments.

FIG. 2 provides a readable indicia processing system environment 200, in accordance with one embodiment of the present invention. As illustrated in FIG. 2, the system server 208 is operatively coupled, via a network 201 to the user device 204, and to the POT system 206. In this way, the system server 208 can send information to and receive information from the user device 204 and the POT system 206 to provide an expedited presentment, viewing, registration, and processing of alternative payment methods, medical office payments, or insurance payments at a POT or at another transaction, such as a statement, bill, or the like. FIG. 2 illustrates only one example of an embodiment of a readable indicia processing system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual making a transaction, such as a financial transaction, medical treatment transaction, receiving a statement, or the like. The transaction may be made at a POT system 206 of a merchant, online or offline, at the merchant's place of business, statement received, at a medical treatment facility, and/or other transaction means. The purchase may be made by the user 202 using any type of payment means available to the user 202, such as, but not limited to cash, credit cards, debit cards, gift cards, checks, insurance, or the like. Furthermore, the user 202 may use his/her user device 204, such as a mobile device, mobile wallet (e.g. smart phone, PDA, or the like) or other types of payment system that may communicate with POT system 206 to allow the user 202 to complete a transaction. Furthermore, in some embodiments, the user 202 may be a merchant or a person, employee, agent, independent contractor, or the like acting on behalf of the merchant to enter into a transaction.

As illustrated in FIG. 2, the system server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POT system 206 and the user device 204. As such, the communication device 246 generally comprises a modem, server, or other device for communicating with other devices on the network 201.

As further illustrated in FIG. 2, the system server 208 comprises computer-readable instructions 254 stored in the memory device 250, which in one embodiment includes the computer-readable instructions 254 of a system application 258. In some embodiments, the memory device 250 includes data storage 252 for storing data related to the system application 258 including but not limited to data created and/or used by the system application 258.

In the embodiment illustrated in FIG. 2 and described throughout much of this specification, the system application 258 allows for the expedited view, receiving, determining, processing, and applying information associated with alternative payment methods, medical office payments, or insurance payments. As such, the financial institution application 258 may receive indications that a user 202 is at a POT system 206 or involved in another transaction, determine information associated with alternative payment methods, medical office payments, or insurance payments, determine the readable indicia that is presented to the user 202, recognize user 202 selected readable indicia, provide and present the user 202 with data associated with alternative payment methods, medical office payments, or insurance payments, and in some embodiments, transmit payment for implementation for the transaction. Furthermore, the system application 258 allows for a communication link between the user device 204, the POT system 206, and other systems to provide the user with readable indicia with information associated with alternative payment methods, medical office payments, or insurance payments.

In some embodiments, the system application 258 may receive indications that a user 202 is at a POT system 206 or is being provided with a statement that has insurance payment associated therewith. The user 202 may be checking out at a merchant, online shopping, manual checkouts, at another type of POT, and/or receiving a statement. The indication that a user 202 transacting may be communicated by the POT system 206 and/or the user device 204. The indication may be that a user 202 is scanning products at a POT system 206, global positioning system (GPS) recognition that a user 202 is located near a POT, the sending of a statement to the user 202, the user 202 scanning a readable indicia, near-field communication, or the like.

In some embodiments, the system application 258 may receive an indication that the user 202 is at a POT system 206 or involved in another transaction prior to providing a readable indicia to the user 202. In this way, the system application 258 may determine information associated with alternative payment methods, medical office payments, or insurance payments, such that this information may be presented to the user 202 via the readable indicia presented to the user 202 at the POT system 206 or during another transaction. In other embodiments, the system application 258 may receive an indication that the user 202 is at a POT system 206 or involved in another transaction by receiving a notification that the user 202 has scanned the readable indicia. In this way, the user 202 may scan a readable indicia at the POT that communicably links the systems. In this way, the system application 258 may determine from a database, system, or the like available information associate with alternative payment methods, medical office payments, or insurance payments. The system application 258 may then communicate the information associated with alternative payment methods, medical office payments, or insurance payments to the user 202 such that they may be presented to the user 202 via his/her user device 204.

In some embodiments, the system application 258 may determine information associated with alternative payment methods, medical office payments, or insurance payments available to the user 202. The alternative payment methods may include, but is not limited to government programs (such as flexible spending accounts (FSA), health savings accounts (HSA), Women, Infants and Children (WIC) program, Supplemental Nutrition Assistance Program (SNAP), and the like), insurance (medical, prescription, auto, and the like), and the like. The information associated with these alternative payment methods may include the determination if products from a transaction are eligible for an alternative payment method, the availability or limit of an alternative payment method, and user 202 discrete or private selection of alternative payment methods for payment for products of the transaction.

In some embodiments, the system application 258 may determine information associated with medical office payments. Medical office payments may include medical treatments such as, but is not limited to treatment at medical offices, dentist offices, hospitals, clinics, chiropractors, or the like. As such the system application 258 may provide the user 202 with an itemized list of treatments performed, the treatments covered by insurance, a co-pay amount, an amount to be paid by the insurance company, detectable information, and an amount the user will owe the medical treatment provider for the medical treatment performed.

In some embodiments, the system application 258 may determine information associated with insurance payments available to the user 202. In this way, when the user 202 receives a statement from a medical treatment provider or the like where insurance may have covered a portion of the cost associated with the transaction, a readable indicia may be placed on the statement. The statement may be electronic or physical form. As such, the system may provide the user 202 with itemized treatments received and payment methods for each. Furthermore, the user 202 may receive information associated with his/her insurance policy, such as deductible and/or the like. The itemized treatments received may indicate the treatments that the user 202 received from the medical provider during the visit, such as exams, tests, and the like. Payment methods for each include an amount, if any, that an insurance company may have contributed and/or the amount due from the user 202 for the treatment.

In some embodiments, once information associate with alternative payment methods, medical office payments, or insurance payments for the user 202 is determined, the system application 258 may determine the readable indicia to present to the user 202. In some embodiments, the system application 258 may present the available information associate with alternative payment methods, medical office payments, or insurance payments to the user 202 via a readable indicia at the POT system 206. In this way, the system application 258 may collect the available information associate with alternative payment methods, medical office payments, or insurance payments and provide them to the POT system 206 in the form of a readable indicia. The readable indicia may comprise the information, such that upon user 202 scanning the readable indicia, the user 202 may view the information on his/her user device 204.

In some embodiments, the information associate with alternative payment methods, medical office payments, or insurance payments may be presented to the user 202 via his/her user device 204. In this way, the user 202 may have already scanned an indicia at the POT system 206 or other transaction. The system application 258 may determine information associate with alternative payment methods, medical office payments, or insurance payments that is available to the user 202 through communication with other systems associated with the network 201.

In some embodiments the system application 258 may recognize a user 202 selected readable indicia. In this way, although the system application 258 may provide readable indicia to the user 202 at a POT or during another transaction, the user 202 may not select to scan the readable indicia. However, after determining information associated with information associate with alternative payment methods, medical office payments, or insurance payments and presenting the same via readable indicia to the user 202. The system application 258 may recognize when a user 202 selects a readable indicia. As such, upon selection the system may provide the user 202 with individualized information associated with alternative payment methods, medical office payments, or insurance payments of the user 202. In some embodiments, the information may be associated with the current transaction.

In some embodiments, if the user 202 does select the readable indicia, the system application 258 may provide and present the user 202 with information associated with alternative payment methods, medical office payments, or insurance payments depending on the transaction type the user 202 is entering into. Furthermore, the system application 258 may allow the user 202 to utilize alternative payment methods or insurance payments for the transaction via the user device 204.

As illustrated in FIG. 2, the POT system 206 generally comprises a reading device 235, a presentment device 237, a communication device 236, a processing device 238, and a memory device 240. The reading device 235 is operatively coupled to the processing device 238, communication device 236, and the memory device 240. The POT system 206 may include a reader device 235 to receive payment account information from the user 202 through the user device 204, system server 208, and/or other potential user 202 payment devices. Such a reader device 235 may include, but is not limited to a magnetic strip reader, a bar code scanner, a radio frequency (RF) reader, a character recognition device, a magnetic ink reader, an NFC reading device, a processor for interpreting codes presented over an electrical or optical medium, a biometric reader, a wireless receiving device, and/or the like.

The POT system 206 may also comprise a presentment device 237. The presentment device 237 may present the readable indicia to a user 202 during a transaction. A person of ordinary skill in the art will appreciate that the presentment device 237 may be a standalone device, may be incorporated into the POT system 206 (such as in the reader device 235), and/or the like. The presentment device 237 may include a screen presentment, reflection presentment, augmented image presentment, touchless communication, touch communication, or other medium that may be viewable and/or scannable.

As further illustrated in FIG. 2, the POT system 206 comprises computer-readable instructions 242 stored in the memory device 240, which in one embodiment includes the computer-readable instructions 242 of a merchant application 244. A POT system 206 may refer to any device that may be configured to carry out a transaction.

In some embodiments, a POT system 206 is or includes an interactive computer terminal that is configured to initiate, perform, complete, and/or facilitate one or more transactions. A POT system 206 could be or include any means that a user 202 may use to perform a transaction with an merchant, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In the embodiment illustrated in FIG. 2, the merchant application 244 allows the POT system 206 to be communicably linked to the system server 208 and other devices on the network 201 to communicate, via a network 201, an indication that the user 202 is at a POT system 206, present indicia, provide information related to the transaction being made, and in some embodiments receive selected alternative payment accounts for payment during the transaction.

In some embodiments, the merchant application 224 may provide the other devices in the readable indicia processing system 200 with an indication that the user 202 is at a POT and initiating a transaction with a merchant. The indication that a user 202 is at a POT system 206 may be communicated when the user 202 approaches the POT, when a product is initially scanned at a POT, when the user 202 scans the indicia, when the user 202 is sent a statement, and/or when the user 202 provides a payment method for purchase of the products of the transaction.

In some embodiments, the merchant application 244 may present indicia to the user 202. In some embodiments, the indicia may be presented initially to indicate that a user 202 is initiating a transaction at a POT. In this way, a communication link is formed between the systems such that the user 202 may be sent information associate with alternative payment methods, medical office payments, or insurance payments from the system server 208 to his/her user device 204. In some embodiments, the indicia may be presented based on the products of the transaction. The readable indicia may be sent to the merchant application 244 from the system server 208 for the user 202 to scan from the presentment device 237. The readable indicia may, in some embodiments, provide, within the indicia, information associate with alternative payment methods, medical office payments, or insurance payments available to the user 202.

FIG. 2 also illustrates a user device 204. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the POT system 206 and the system server 208. As such, the communication device 212 generally comprises a modem, server, or other device for communicating with other devices on the network 201.

As further illustrated in FIG. 2, the user device 204 comprises computer-readable instructions 220 stored in the memory device 216, which in one embodiment includes the computer-readable instructions 220 of a user application 222. In this way, the user application 222 allows a user 202 to scan the readable indicia, decode the indicia, present information associate with alternative payment methods, medical office payments, or insurance payments, and communicate selected payment methods to the POT system 206. A "user device" 204 may be any mobile communication device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single user device 204 is depicted in FIG. 2, the POT offer processing system environment 200 may contain numerous user devices 204.

In some embodiments, the user application 222 allows a user 202 to scan and/or recognize a readable indicia. The user 202 may scan the indicia using the camera functionality, scanning functionality, or the like of his/her user device 204. The user application 222 may then recognize the readable indicia and/or the information associate with alternative payment methods, medical office payments, or insurance payments thereon. Upon recognition of the readable indicia, the user application 222 may, in some embodiments, present the user 202 with information associate with alternative payment methods, medical office payments, or insurance payments via an interface associated with the user device 204. In other embodiments, upon recognition of the indicia the user application 222 may communicate with the system server 208 to transmit user 202 data and receive available information associate with alternative payment methods, medical office payments, or insurance payments to present to the user 202.

In some embodiments, the user application 222 may decode the indicia that was scanned. In some embodiments, the user application 222 may decode the indicia that includes information associate with alternative payment methods, medical office payments, or insurance payments available to the user 202. In this way, upon decoding the indicia, the user application 222 may present information associate with alternative payment methods, medical office payments, or insurance payments to the user 202 via an interface associated with the user device 204. In other embodiments, the user application 222 may decode the indicia to find instructions to communicate with the system server 208. In this way, upon decoding the indicia, the user device 204 may communicate with the system server 208. The system server 208 may then communicate up to date information associate with alternative payment methods, medical office payments, or insurance payments to the user 202 via an interface associated with the user device 204.

Once the indicia is decoded, the user application 222 may present the information associate with alternative payment methods, medical office payments, or insurance payments to the user 202. Whether the information associate with alternative payment methods, medical office payments, or insurance payments are decoded from the indicia or communicated from the system server 208, the user application 222 may present the information associate with alternative payment methods, medical office payments, or insurance payments to the user 202 via an interface via a viewable screen or the like associated with the user device 204. In this way, the user 202 may be able to visualize the available information associate with alternative payment methods, medical office payments, or insurance payments, as further illustrated below in FIGS. 3-11. The user 202 may then be able to select the alternative payment methods that a user 202 may wish to use for his/her current transaction or future transactions. In other embodiments, the user 202 may be able to view medical office payments to determine insurance coverage, cost owed for medical treatment, and for payment for medical treatment. In other embodiments, the user 202 may be able to view insurance payment information. In this way, when the user 202 receives a statement, bill, or the like, the user 202 may be able to visualize, via a readable indicia, itemized treatments received, payment methods for each treatment, information associated with the payment still pending, and an ability to pay the still pending payment via the user device 204 communicating with the other systems on the network 201.

Finally, the user application 222 may communicate the user 202 selected payment methods for the transaction, if necessary. The selected payment methods, such as alternative payment methods or insurance coverage may be communicated to the system server 208 and/or the POT system 206 via the network 201. The selected payment methods for the transaction may then be applied to the transaction the user 202 is currently entering into and/or future transactions.

The servers, systems, and devices described herein may also communicate with various other servers, systems, and devices not illustrated herein. As such, the servers, systems, and devices may communicate with insurance company servers, payment processing servers, or the like.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3, FIG. 4, FIG. 5, and FIG. 6 illustrate various embodiments of user selection, presentment, and acceptance of alternative payment methods using readable indicia. FIG. 3 illustrates a process map of presentment and acceptance of alternative payment methods using readable indicia at a POT 300, in accordance with one embodiment of the present invention.

As illustrated in block 302 of FIG. 3 the system may receive an indication of a user initiating a transaction at a POT. The initiating of a transaction may include, but is not limited to a user 202 approaching a merchant POT and allowing a merchant to scan products, the user 202 inputting products into an online shopping card for later purchase, and/or the like. In this embodiment, a transaction may include any type of purchase or the like that may accept alternative payment methods. These transactions may include purchases of food, medicine, or the like. Alternative payment methods may include one or more of government programs (such as flexible spending accounts (FSA), health savings accounts (HSA), Women, Infants and Children (WIC) program, Supplemental Nutrition Assistance Program (SNAP), and the like), insurance (medical, prescription, auto, and the like), and the like.

Upon receiving the indication of the user 202 is initiating a transaction at a POT, the system may, as illustrated in block 304, identify the products of the transaction. An identification of the products of the transaction may provide data such as the products the user 202 is purchasing, the type of products the user 202 is purchasing, and/or the like. In this way, the system may be able to determine specific information about the products of the purchase and if the products are possibly eligible for alternative payment methods. Furthermore, the identification of the products may also include an identification of the user 202 of the transaction. This may be done via the user 202 scanning a loyalty card, credit card, or the like that may provide the system with information associated with that user 202.

As illustrated in block 306, once the products of the transaction have been identified, the system may be able to determine which of the products are eligible for alternative payment methods. For example, if the user 202 is purchasing several products, Product A, Product B, and Product C, the system may determine that it is possible that Product A and Product B are eligible for alternative payment methods. However, in some embodiments, the system may have to determine if Product A and Product B are eligible for alternative payment methods for that specific user 202. The specific user 202 information may be obtained by the user 202 via his/her user device when the user 202 scans the readable indicia.

As such, as illustrated in block 308, the system may present the readable indicia at the POT. In some embodiments the system may provide the readable indicia to the POT device for presentment. In other embodiments, the POT system may generate the readable indicia based on information communicated with the system.

As illustrated in block 310, the system may receive an indication that the user 202 has scanned the readable indicia. The scanning may be done via a scanning functionality, photo taking functionality, or any other image recognition functionality associated with the user device 204. The indication may be a communication from the user device 204 and/or the POT system 206.

At this point, the user 202 may be able to privately access and view his/her alternative payment methods via his/her user device 204. Furthermore, the system may be able to access information relating to the user 202 from his/her user device 204. This information may include the user's name, address, and other personal information. The system may then utilize this information to communicate with providers of alternative payment methods to determine which alternative payment methods the user 202 has available to him/her, balances remaining on alternative payment methods, products that are eligible for that user's alternative payment method, and the like.

Using this information, in combination with the identified products of the transaction from block 304, the system may present the user 202 via the user device 204 products that are eligible for his/her alternative payment methods, as illustrated in block 311. At this point, the user 202 may be able to view the products of his/her transaction that are eligible for alternative payment methods. This capability allows the user 202 to view all products eligible for any of his/her alternative payment methods. Furthermore, the capability to view these products privately via the user's user device 204.

Upon viewing the alternative payment methods available to the user 202, the user 202 may also select the products and/or alternative payment methods that he/she may wish to use for the current transaction. As such, as illustrated in block 312 the system may receive communication of user accepted alternative payment methods for one or more products of the transaction. In this way, the user 202 may select the specific products that he/she may apply his/her alternative payment method. For example, if Product A and Product B both are eligible for alternative payment methods, the user 202, using his/her user device 204 may only selection to apply an alternative payment method to Product B for this transaction. In some embodiments, a product may qualify for more than one alterative payment method. As such, the user 202 may be able to determine and select the alternative payment method that the user 202 may wish to use for that particular product.

Next, as illustrated in block 314, the user 202 selected alternative payment method (and the product associated therewith) may be applied to the current transaction. The system may apply the alternative payment method to the transaction via communication with the POT device 206 using the network 201. In this way, the system may provide information associated with alternative payment methods to the POT 206, for the POT system 206 to process alternative payment methods with the user's transaction. The system may be in communication with systems, servers, databases, or the like that are associated with the alternative payment methods to receive and communicate the information necessary for the merchant to process the alternative payment method for the user's transaction.

Finally, as illustrated in block 316, the transaction may be completed between the user 202 and the merchant. The transaction may include the alternative payment methods that were accepted by the user 202. In this way, the alternative payment methods may be utilized in real-time to transactions the user 202 is entering into. As such, the invention may allow for more expedited and private use of alternative payment methods at a merchant for a transaction.

FIG. 4 illustrates a decision map illustrating user selection of presentment and acceptance of alternative payment methods using readable indicia at a POT 500, in accordance with one embodiment of the present invention. As illustrated in decision block 502, the user 202 may decide to transact with a merchant. If the user 202 does not initiate a transaction, the process may be terminated at that time. If, however, the user 202 initiates a transaction with a merchant, the user 202 may present products to the POT of the merchant, as illustrated in block 504. The POT may be online, at a merchant physical location, a received statement, or the like.

Next, the POT may present the user 202 with a readable indicia. The readable indicia may include a bar code, quick response (QR) code, token, contact connection, near field connection, contactless connection, and/or the like presented at or near the POT.

FIG. 5 illustrates a POT interface incorporating a readable indicia 400, in accordance with one embodiment of the present invention. As illustrated in the POT interface 400, the user 202 may be at a POT of a merchant initiating a transaction. The merchant may be scanning products of the user's transaction. The POT interface 400 may display the transaction 402, the products 404 of the transaction, and the price 406 associated with each product on the POT interface 400. In the example illustrated in FIG. 5, the user 202 is purchasing Product A, Product B, Product C, Product D, and Product E for a total price of $XXX.XX. The user 202 may then be able to proceed with the transaction using the select payment type 408 function and complete the transaction 414. However, the user 202 may also have the option to scan readable indicia associated with the transaction, as illustrated in section 410. The user may select to scan the readable indicia 412 using his/her user device 204 to receive information associated with alternative payment methods that the user 202 has available to him/her for Product A, Product B, Product C, Product D, and Product E of his/her purchase.

Referring back to FIG. 4, the user 202 may then, as illustrated in decision block 506, scan the presented readable indicia using his/her user device 204 presented at the merchant POT, such as the POT interface 400. If the user 202 does not scan the readable indicia, the process is terminated and the user 202 may tender funds for the transaction without using alternative methods of payment. If the user 202 scans the readable indicia via his/her user device 204 the user may receive an indication of the products of the transaction that are available for the alternative payment methods the user 202 is enrolled in, as illustrated in block 508. As illustrated in decision block 510, the user 202 may then accept the use of alternative payment methods for one or more products of the transaction. Furthermore, the user 202 may be able to selection one alternative payment method for a product if two or more alternative payment methods are available for the product. If the user 202 does not select an alternative payment method for the transaction, the transaction proceeds with the merchant, without an alternative payment method being applied to the transaction.

FIG. 6 illustrates a user device interface 600 for user viewing, selection, and acceptance of alternative payment methods, in accordance with one embodiment of the present invention. In order to scan the readable indicia, the user 202 may activate his/her user device and be presented with the user device home screen, as illustrated in section 602. Next the user 202 may utilize a camera, scanner, or other recognition medium on a user device 204 to capture the readable indicia, as illustrated in section 604. In this illustration the readable indicia is a bar code, however the readable indicia may include bar codes, quick response (QR) codes, tokens, contact connections, near field connections, contactless connections, and/or the like. Once the indicia is captured, the user 202 may be displayed the alternative payments available for products of the transaction, as illustrated in section 606. For example, the user 202 may be transacting for at least Product 1, Product 2, Product 3, and Product 4. The user 202 may also be transacting for other products, however, these products are the ones that the system determined to be eligible to use one or more alternative payment methods. In this example, Product 1 is eligible for an HSA, Product 2 is eligible for an FSA, Product 3 is eligible for WIC, and Product 4 is eligible for food stamps.

In section 606, the user 202 may select one or more of the alternative payment methods to use for the transaction for each of the one or more products of the transaction. As such, the selected alternative payment methods may be displayed for user 202 confirmation in section 610. In this example the user 202 has selected to use alternative payment methods for the purchase of Product 1 and Product 4. The user 202 may be prompted to apply the alternative payment method to the current transaction.

Referring back to FIG. 4, as illustrated in block 512, the system may apply the alternative payment method and the account associated therewith to the transaction. In this way, the system may communicate with the POT device 204 and/or systems, servers, databases, or the like associated with the alternative payment method in order to facilitate the POT device 204 receiving and applying of the alternative payment method to the current transaction.

As illustrated in block 514, if the alternative payment method does not pay for the entire transaction, the user 202 may then receive a total cost for the transaction after the selected alternative payment methods have been applied to the transaction. As such, the user 202 may be required to provide another payment account for the remained of the transaction.

Once the alternative payment method and another payment account (if necessary) is provided the transaction may be completed by applying the alternative payment method and the other payment account to the transaction, as illustrated in block 516.

Referring again back to FIG. 6, section 608 allows a user 202 to view his/her alternative payment accounts. In the example illustrated in FIG. 6 the user 202 has an HSA, WIC, FSA, and Food Stamp account. The user 202 may also have other accounts or be able to add subsequent accounts to his/her available accounts by selection the other accounts section. The user 202 may view individual accounts and the status, information, balance, and the like associated with the same. If the user 202 selects an account, as illustrated in section 612 the user 202 may be able to review details associated with the selected account.

FIG. 7, FIG. 8, and FIG. 9 illustrate various embodiments of user selection, presentment, and acceptance of medical office payments using readable indicia. In this way, embodiments of the invention provide for readable indicia for medical office payment. As such, a user 202 may be presented with, via his/her user device 204, insurance information associated with medical treatment. Medical treatments may include, but is not limited to treatment at medical offices, dentist offices, hospitals, clinics, chiropractors, or the like. Upon completing the transaction with the medical treatment provider, a POT device 206, screen, or the like associated with the medical treatment provider may present readable indicia for the user 202. The presented readable indicia may be user 202 specific, such that upon scanning the readable indicia, the user 202 may receive insurance information associated with the medical treatment. As such, the system may communicate with insurance providers and the medical treatment provider to determine and present the user 202 with itemized list of treatments performed, the treatments covered by insurance, a co-pay amount, an amount to be paid by the insurance company, detectable information, and an amount the user will owe the medical treatment provider for the medical treatment performed. At this point the user 202 may be able to pay his/her amount owed via his/her mobile wallet using the user device. The user may also pay the remaining balance owed by traditional means, such as cash, check, or credit card.

FIG. 7 illustrates a process map of presentment of medical office payments using readable indicia at a medical treatment provider POT 700, in accordance with one embodiment of the present invention. As illustrated in block 702 of FIG. 7, the system may receive an indication of a user 202 is being provided medical treatment. The initiating of medical treatment may include, but is not limited to treatment at a clinic, hospital, office, pharmacy, specialist, or the like.

Upon receiving the indication of the user 202 is being provided medical treatment, the system may identify services of the medical treatment, user insurance information, and providers of the same, as illustrated in block 704. Once this information is determined in block 704, the system may communicate between the medical treatment provider and the insurance company to determine insurance coverage for the medical treatment provided, as illustrated in block 706.

Next, as illustrated in block 708 the user 202 may be presented with a readable indicia for the user 202 to scan. In some embodiments, the readable indicia may be dynamically presented to the user 202 with user 202 medical office payment information specifically tailored to the user's medical treatment. In some embodiments, the indicia may be generic and may not be dynamic contain medical office payment information specifically tailored to the user 202 until after a communication link between the user device 204 and the system is created. The readable indicia may be presented at checkout from the medical treatment provider. As such, the system may determine the medical treatment provided, the insurance coverage for that treatment, and the like prior to the user 202 being presented with the readable indicia.

As illustrated in block 710, the system may receive an indication that the user 202 has captured the indicia. In some embodiments, this creates a communicable link between the system and the user device 204. Upon receiving the indication that the user 202 has captured the readable indicia in block 710, the system may present the user with line item details of the treatments performed and insurance payment details associated therewith, as illustrated in block 712. This information may be provided to the user 202 via his/her user device 204. In this way, the user 202 may receive information associated with the medical treatment, such as, but not limited to detailed descriptions of the treatment, insurance coverage, co-pay amount required, deductible, total cost after insurance, and the like. For example, detailed descriptions of the treatment may include a line item detail about each of the treatments preformed and a price associated therewith. For example, the line item detail may break the treatment into an X-ray, blood test, examination, or the like. Insurance coverage may be included on the line item detail of each treatment illustrating how much of the cost of each treatment was covered by insurance. Also, the system may provide information about in-network versus out-of-network medical treatment provider costs for similar treatments. The system may also provide the user 202 with information associated with co-pays required, total cost to the user 202 after insurance coverage, and the like. Furthermore, the system may also provide the user 202 with insurance information independent of the medical treatment provider he/she is currently visiting. This information may include general deductible information, effect on deductible based on current treatment, plan coverage, and the like.

Finally, as illustrated in block 714, the transaction may be completed between the user 202 and the medical treatment provider at the medical treatment provider POT. The user 202 may utilize his/her user device 204 to complete the transaction, such as using his/her user device 204 as a mobile wallet or the like. As such the user device 204 may be in communication with the medical treatment provider POT and/or other systems associated with the network 201. In some embodiments, the user 202 may be able to pay using traditional payment methods, such as checks, cash, or credit cards. In yet other embodiments, the user 202 may be able to select via his/her user device 204 to be billed later for the medical treatment. The transaction may include the insurance coverage, co-pay, or the like that were determined by the system based at least in part on an analysis of the medical treatment provided and the insurance coverage (or type) of the user 202. In this way, the user 202 may know, while at the medical treatment provider, the exact cost of the medical treatment.

FIG. 8 provides a decision map illustrating user 202 selection and viewing of medical office payments using readable indicia 800, in accordance with one embodiment of the present invention. As illustrated in in decision block 802 the user 202 determines if the user 202 has received medical treatment from a medical treatment provider. If the user 202 does not receive treatment from a medical treatment provider the process is terminated. If the user 202 does receive medical treatment, after receiving the treatment during check-out, the user 202 may be presented with readable indicia at the medical treatment provider POT. As illustrated in decision block 806, when the system presents the readable indicia, the user 202 has the decision to scan the readable indicia via his/her user device 204. If the user 202 does not scan the readable indicia, the process may be terminated.

As illustrated in block 808, if the user 202 decides to scan the readable indicia, the user 202 may receive details associated with the treatment and insurance payment details associated with the same. In this way, the user 202 may receive information associated with the medical treatment, such as, but not limited to detailed descriptions of the treatment, insurance coverage, co-pay amount required, deductible, total cost after insurance, and the like.

FIG. 9 illustrates a user device interface for user viewing of medical office payments using readable indicia 900, in accordance with one embodiment of the present invention. In order to scan the readable indicia, the user 202 may activate his/her user device and be presented with the user device home screen, as illustrated in section 902. Next the user 202 may utilize a camera, scanner, or other recognition medium on a user device 204 to capture the readable indicia, as illustrated in section 904. In this illustration the readable indicia is a bar code, however the readable indicia may include bar codes, quick response (QR) codes, tokens, contact connections, near field connections, contactless connections, and/or the like. Once the indicia is captured, the user 202 may be displayed the treatment and insurance payment details associated with the same.

As illustrated in section 906, the user 202 is presented with the treatment and insurance payment details associated with the treatment. In this example, the user 202 display presents the user 202 with a total cost of the medical treatment, the co-pay that the user 202 has to provide to the medical treatment provider based on the insurance plan of the user 202, the amount the insurance company has covered of the medical treatment, and the out-of-pocket amount including co-pay and remaining portion required to be paid by the user 202. In other embodiments, the system may provide the user 202 with an itemized list of each treatment performed by the medical treatment provider and the price, insurance coverage, and the like of each of the same. In this way, the user 202 may be able to view an itemized list of all treatments, the cost both pre- and post-insurance, as well as an overall cost for the treatment via the privacy associated with his/her user device 204. If the user 202 agrees with and/or accepts the treatment, insurance coverage, and the like, the user 202 may select the accept button and the user 202 will be directed to the payment due to medical treatment provider section 910. In this way, the co-pay that the user 202 may pay to the medical treatment provider, the total due form the user 202 to the medical treatment provider after insurance coverage and the like may be provided to the user 202 via the user device 204. In this way, the user 202 may utilize a mobile wallet or the like associated with the user device 204 to pay the co-pay for the medical treatment and/or pay the entire treatment cost at the medical treatment provider POT.

Referring back to FIG. 8, at decision block 810 the user 202 may accept the price associated with the medical treatment at the medical treatment provider POT. In some embodiments, this may be in the form of a co-pay. In some embodiments, this may be the entire treatment price. In yet other embodiments, this may be a portion of the payment of the entire treatment determined not to be covered by the insurance provider. If the user 202 does not accept, the process is terminated. As illustrated in block 812, if the user 202 accepts, the insurance is applied to the medical transaction from the medical treatment provider. Finally, the transaction may be completed at the medical treatment provider, as illustrated in block 814.

Referring again back to FIG. 9, the user 202 may also be able to view other aspects of his/her insurance coverage in general and/or related to the medical treatment. As illustrated in section 908, the user 202 may be able to visualize his/her insurance information. In the example illustrated in section 908 the user 202 may select and visualize his/her deductible, statements (both past and present), as well as any outstanding or closed claims. Once selected the user 202 may be able to then select to review the insurance information as illustrated in section 912.

FIG. 10 and FIG. 11 illustrate various embodiments of presentment of insurance payments using readable indicia from a statement. A statement may include a bill, invoice, explanation of benefits, and/or the like and may be electronic or physical in form. In this way, the user 202 may be presented with readable indicia for insurance payments. As such, when the user 202 receives a statement from a medical treatment provider, insurance, another statement or the like where insurance may have covered a portion of the cost associated with the transaction. A readable indicia may be placed on the statement. As such, a user 202 may be able to scan the readable indicia using his/her user device 204. As such, the system may provide the user 202 with itemized treatments received and payment methods for each. Furthermore, the user 202 may receive information associated with his/her insurance policy, such as deductible and/or the like. The itemized treatments received may indicate the treatments that the user 202 received from the medical provider during the visit, such as exams, tests, and the like. Payment methods for each include an amount, if any, that an insurance company may have contributed and/or the amount due from the user for the treatment.

FIG. 10 illustrates the presentment of insurance payments using readable indicia from a statement 1000, in accordance with one embodiment of the present invention. As illustrated in block 1002, the system may receive an indication of a statement to be provided to the user 202. The statement may include one or more insurance payments associated therewith. Once the system receives an indication that a statement is going to be provided to the user 202, the system may identify the medical treatments that may be associated with the statement, as illustrated in block 1006. In this way, the system may determine each of the one or more medical treatments provided by the medical treatment provider to the user 202. Furthermore, as illustrated in block 1008, once the system identifies that a statement is being presented to the user 202, the system may determine itemized treatments and payment methods associated therewith. For example, if the statement has one or more medical treatments, insurance covered events, which may include medical treatment, automotive maintenance, home repairs, and the like. As such, the system may determine an itemized treatment and payment method. Therefore, each of the one or more treatments or events may be itemize and a payment method may then be identified and listed for each. For example, if the user 202 received Treatment A, Treatment B, and Treatment C, the system may identify each of the treatments and also the payment methods. As such, Treatment A may have been fully paid for by Insurance A. Treatment B may have also been paid for by Insurance A, but Treatment B may have only been partially covered by Insurance A. Therefore the user 202 may owe on Treatment B. Treatment C may have been paid for by Insurance B.

Once the itemized treatment list is determined as well as the payment methods associated therewith, as illustrated in block 1008, the system may present readable indicia associated with the itemized treatment and payment methods on the user's statement, as illustrated in block 1010.

FIG. 11 illustrates a statement incorporating a readable indicia 1100, in accordance with one embodiment of the present invention. In this embodiment, the statement is from a medical provider. In other embodiments, the statement may include other treatments or events that may be associated with a statement. As illustrated in section 1102 the statement identifies the medical treatments associated with the statement. In some embodiments, the date 1104, treatment 1106, and/or price 1108 of the treatment. For example, in the embodiment illustrated in FIG. 11 the statement includes five different medical treatments 1102 on Date A and Date B. The statement may also provide a total amount due from the user 202. However, the statement may not provide the user 202 with itemized treatment information and/or payment methods associated therewith from an insurance company or the like. As such, the user 202 is provided with a readable indicia to receive itemized treatment and payment methods, as illustrated in section 1110. As such, in order to visualize, privately, the itemized treatment and payment methods associated with the same, the user 202 may scan the readable indicia, as illustrated in 1112. The user 202 may also decide to complete the transaction, as illustrated in section 1114. In some embodiments, this may include provided a payment means to the treatment provider.

Referring back to FIG. 10, as illustrated in block 1011, the system may receive an indication that the user 202 has scanned the readable indicia from the statement 1100. Once the user 202 has scanned the readable indicia from the statement and the system recognizes the same, the system may present itemized treatments and payment methods associated with the statement to the user 202 via the user device, as illustrated in block 1012. Furthermore, the user 202 may receive general insurance coverage information. The itemized treatments may show specific information about each and every treatment within the statement. The payment methods may include any insurance, third party, or other payment or deduction associated with the treatments of the statement. In this way, the user 202 may be able to visualize the itemized treatments, the amount already applied to the treatments, and the amount of the statement that is the user's responsibility.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing readable indicia for healthcare payment codes, the system comprising:
    a memory device with computer-readable program code stored thereon;
    a communication device;
    a processing device operatively coupled to the memory device and the communication device, wherein the processing device is configured to execute the computer-readable program code to:
        receive an indication that a user is initiating a transaction at a point-of-transaction (POT) of a merchant, wherein the merchant is a healthcare provider;
        receive information associated with one or more products of the transaction, wherein the products are healthcare related products;
        determine alternative payment methods available for the products of the transaction, wherein the available alternative payment methods are based at least in part on one or more of information associated with the products of the transaction, information associated with the user initiating the transaction, or the merchant of the transaction;
        generate a readable indicia for presentment at the POT of the merchant, wherein the readable indicia is scannable by a mobile device of the user, and wherein scanning the readable indicia results in creating a communicable link with the mobile device for presenting alternative payment information;
        present a readable indicia to the POT of the merchant, wherein the readable indicia includes information associated with the one or more eligible alternative payment methods available for the products;
        enable the user to scan the readable indicia from the POT of the merchant using a mobile device of the user;
        receive information associated with the user when the user scans the readable indicia from the POT of the merchant, wherein the information comprises insurance information of the user;
        determine the user eligibility for each of one or more alternative payment methods based on at least the information associated with the user received, wherein the user eligibility is based on one or more of user enrollment in the one or more alternative payment method and current status of a user's alternative payment method account;
        determine if more than one of the one or more alternative payment methods apply to at least one product of the transaction;
        present the products of the transaction and the one or more eligible alternative payment methods available for the products to the user via the mobile device;
        receive a user selection of at least one of the one or more eligible alternative payment methods available for the products to the user; and
        allow processing of the transaction in near real-time, wherein the transaction is processed using a combination of a portion of funds from the at least one of the one or more accepted alternative payment methods, such that the at least one of the one or more alternative payment methods are applied to the at least one product of the transaction.

2. The system of claim 1, wherein determining alternative payment methods available for the products of the transaction:
    determining product eligibility for the one or more alternative payment methods; the eligible alternative payment methods available to the user; and
    determining merchant acceptance of the one or more alternative payment methods.

3. The system of claim 1, wherein the alternative payment methods include insurance coverage or government programs associated with transaction aid for the user.

4. The system of claim 1, wherein presenting to the user a readable indicia further comprises dynamically presenting the readable indicia at the POT of the merchant, such that the readable indicia changes form based at least in part on the available alternative payment methods available.

5. The system of claim 1, wherein the readable indicia comprises a Quick Response (QR) code.

6. The system of claim 1, wherein the readable indicia is comprised in a tag that transmits information wirelessly.

7. The system of claim 1, wherein receiving an indication that user selected the readable indicia further comprises receiving an indication from the mobile device that comprises an image-capturing component, and wherein an image of the readable indicia is captured by the mobile device.

8. The system of claim 1, wherein the merchant is a merchant that accepts one or more alternative payment methods as payment for the transaction.

9. The system of claim 3, wherein the government programs associated with transaction aid for the user are based at least in part on one or more alternative payment method accounts, wherein the alternative payment method accounts include one or more government available accounts, such as flexible spending accounts (FSA), health savings accounts (HSA), Women, Infants and Children (WIC) program, or Supplemental Nutrition Assistance Program (SNAP).

10. A computer program product for processing readable indicia for healthcare payment codes, the computer program product comprising at least one non-transitory computer-readable medium having computer-readable program code portions embodied therein, the computer-readable program code portions comprising:
   an executable portion configured for receiving an indication that a user is initiating a transaction at a point-of-transaction (POT) of a merchant, wherein the merchant is a healthcare provider;
   an executable portion configured for receiving information associated with one or more products of the transaction, wherein the products are healthcare related products;
   an executable portion configured for determining alternative payment methods available for the products of the transaction, wherein the available alternative payment methods are based at least in part on one or more of information associated with the products of the transaction, information associated with the user initiating the transaction, or the merchant of the transaction;
   an executable portion configured for generating a readable indicia for presentment at the POT of the merchant, wherein the readable indicia is scannable by a mobile device of the user, and wherein scanning the readable indicia results in creating a communicable link with the mobile device for presenting alternative payment information;
   an executable portion configured for presenting a readable indicia to the POT of the merchant, wherein the readable indicia includes information associated with the one or more eligible alternative payment methods available for the products;
   an executable portion configured for enabling the user to scan the readable indicia from the POT of the merchant using a mobile device of the user;
   an executable portion configured for receiving information associated with the user when the user scans the readable indicia from the POT of the merchant, wherein the information comprises insurance information of the user;
   an executable portion configured for determining the user eligibility for each of one or more alternative payment methods based on at least the information associated with the user received, wherein the user eligibility is based on one or more of user enrollment in the one or more alternative payment method and current status of a user's alternative payment method account;
   an executable portion configured for determining if more than one of the one or more alternative payment methods apply to at least one product of the transaction;
   an executable portion configured for presenting the products of the transaction and the one or more eligible alternative payment methods available for the products to the user via the mobile device;
   an executable portion configured for receiving a user selection of at least one of the one or more eligible alternative payment methods available for the products to the user; and
   an executable portion configured for allowing processing of the transaction in near real-time, wherein the transaction is processed using a combination of a portion of funds from the at least one of the one or more accepted alternative payment methods, such that the at least one of the one or more alternative payment methods are applied to the at least one product of the transaction.

11. The computer program product of claim 10, wherein determining alternative payment methods available for the products of the transaction:
   determining product eligibility for the one or more alternative payment methods; the eligible alternative payment methods available to the user; and
   determining merchant acceptance of the one or more alternative payment methods.

12. The computer program product of claim 10, wherein the alternative payment methods include insurance coverage or government programs associated with transaction aid for the user.

13. The computer program product of claim 10, wherein presenting to the user a readable indicia further comprises dynamically presenting the readable indicia at the POT of the merchant, such that the readable indicia changes form based at least in part on the available alternative payment methods available.

14. The computer program product of claim 10, wherein the readable indicia comprises a Quick Response (QR) code or a tag that transmits information wirelessly.

15. The computer program product of claim 10, wherein receiving an indication that user selected the readable indicia further comprises receiving an indication from the mobile device that comprises an image-capturing component, and wherein an image of the readable indicia is captured by the mobile device.

16. The computer program product of claim 10, wherein the merchant is a merchant that accepts one or more alternative payment methods as payment for the transaction.

17. The computer program product of claim 12, wherein the government programs associated with transaction aid for the user are based at least in part on one or more alternative payment method accounts, wherein the alternative payment method accounts include one or more government available accounts, such as flexible spending accounts (FSA), health savings accounts (HSA), Women, Infants and Children (WIC) program, or Supplemental Nutrition Assistance Program (SNAP).

18. A computer-implemented method for processing readable indicia for healthcare payment codes, the method comprising:
   receiving an indication that a user is initiating a transaction at a point-of-transaction (POT) of a merchant, wherein the merchant is a healthcare provider;
   receiving information associated with one or more products of the transaction, wherein the products are healthcare related products;
   determining, via a computer processing device, alternative payment methods available for the products of the transaction, wherein the available alternative payment methods are based at least in part on one or more of information associated with the products of the transaction, information associated with the user initiating the transaction, or the merchant of the transaction;
   generating a readable indicia for presentment at the POT of the merchant, wherein the readable indicia is scannable by a mobile device of the user, and wherein scanning the readable indicia results in creating a communicable link with the mobile device for presenting alternative payment information;
   presenting, via a computing device processor, a readable indicia to the POT of the merchant, wherein the readable indicia includes information associated with the one or more eligible alternative payment methods available for the products;

enabling, via a computing device processor, the user to scan the readable indicia from the POT of the merchant using a mobile device of the user;

receiving information associated with the user when the user scans the readable indicia from the POT of the merchant, wherein the information comprises insurance information of the user;

determining the user eligibility for each of one or more alternative payment methods based on at least the information associated with the user received, wherein the user eligibility is based on one or more of user enrollment in the one or more alternative payment method and current status of a user's alternative payment method account;

determining, using a computing device processor, if more than one of the one or more alternative payment methods apply to at least one product of the transaction;

present the products of the transaction and the one or more eligible alternative payment methods available for the products to the user via the mobile device;

receiving a user selection of at least one of the one or more eligible alternative payment methods available for the products to the user; and allowing processing of the transaction in near real-time, wherein the transaction is processed using a combination of a portion of funds from the at least one of the one or more accepted alternative payment methods, such that the at least one of the one or more alternative payment methods are applied to the at least one product of the transaction.

19. The method of claim 18, wherein determining alternative payment methods available for the products of the transaction:

determining product eligibility for the one or more alternative payment methods; the eligible alternative payment methods available to the user; and determining merchant acceptance of the one or more alternative payment methods.

20. The method of claim 18, wherein presenting to the user a readable indicia further comprises dynamically presenting the readable indicia at the POT of the merchant, such that the readable indicia changes form based at least in part on the available alternative payment methods available.

21. The method of claim 18, wherein the readable indicia comprises a Quick Response (QR) code or a tag that transmits information wirelessly.

22. The method of claim 18, wherein receiving an indication that user selected the readable indicia further comprises receiving an indication from the mobile device that comprises an image-capturing component, and wherein an image of the readable indicia is captured by the mobile device.

23. The method of claim 18, wherein the merchant is a merchant that accepts one or more alternative payment methods as payment for the transaction.

* * * * *